May 19, 1942.  B. STECHBART  2,283,586
LIGHT SHUTTER
Filed Feb. 28, 1940  6 Sheets-Sheet 1
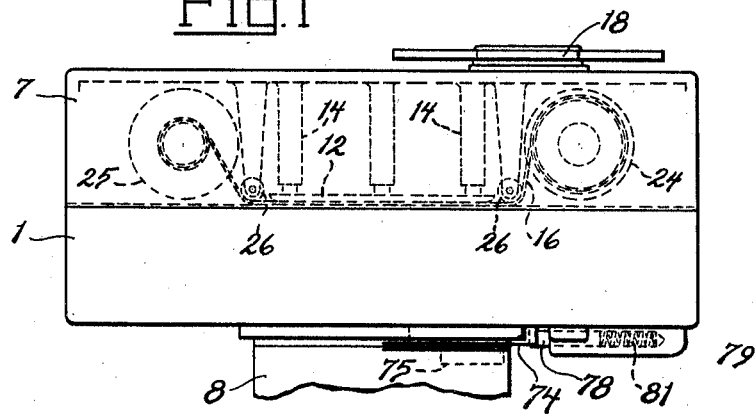
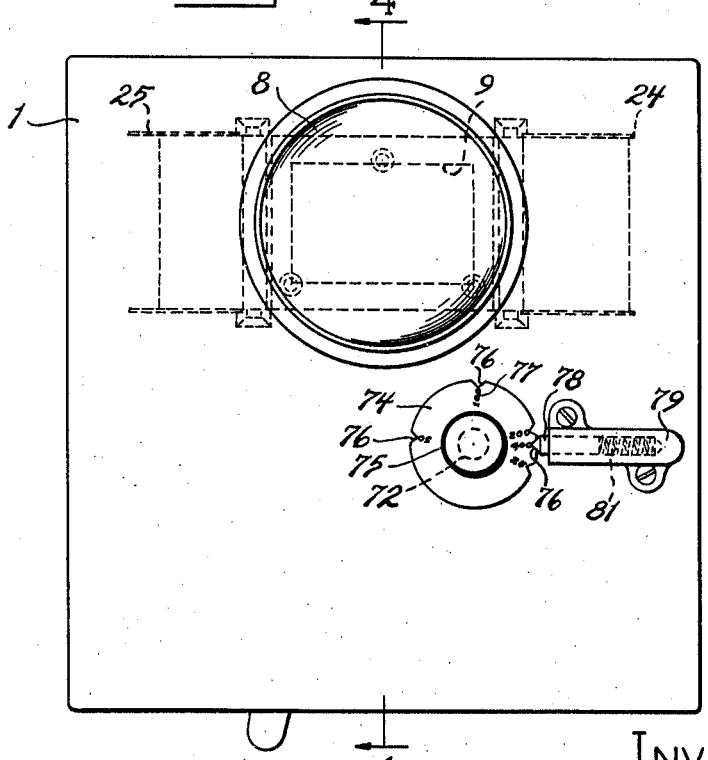
INVENTOR
BRUNO STECHBART
BY Robert F. Miehle
ATTY.

May 19, 1942.　　B. STECHBART　　2,283,586
LIGHT SHUTTER
Filed Feb. 28, 1940　　6 Sheets-Sheet 2
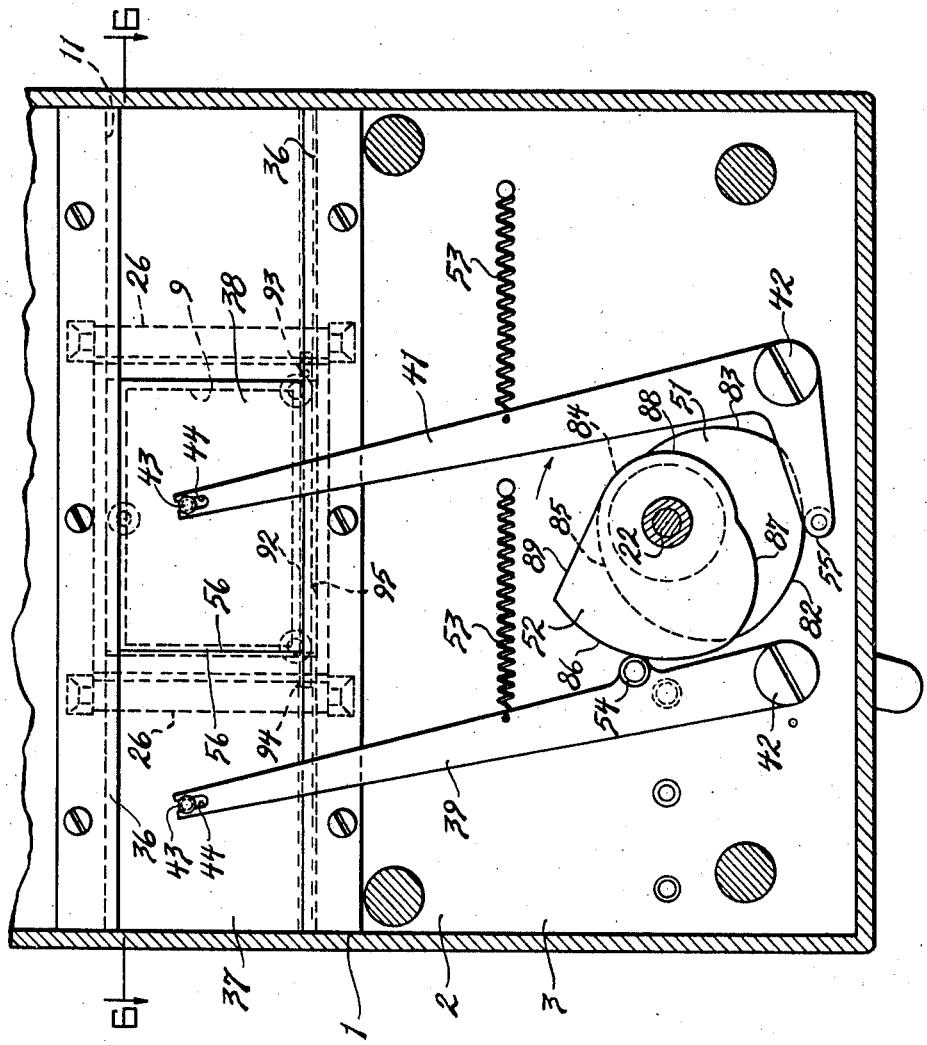
INVENTOR
BRUNO STECHBART
BY
ATTY.

May 19, 1942.   B. STECHBART   2,283,586
LIGHT SHUTTER
Filed Feb. 28, 1940   6 Sheets-Sheet 3
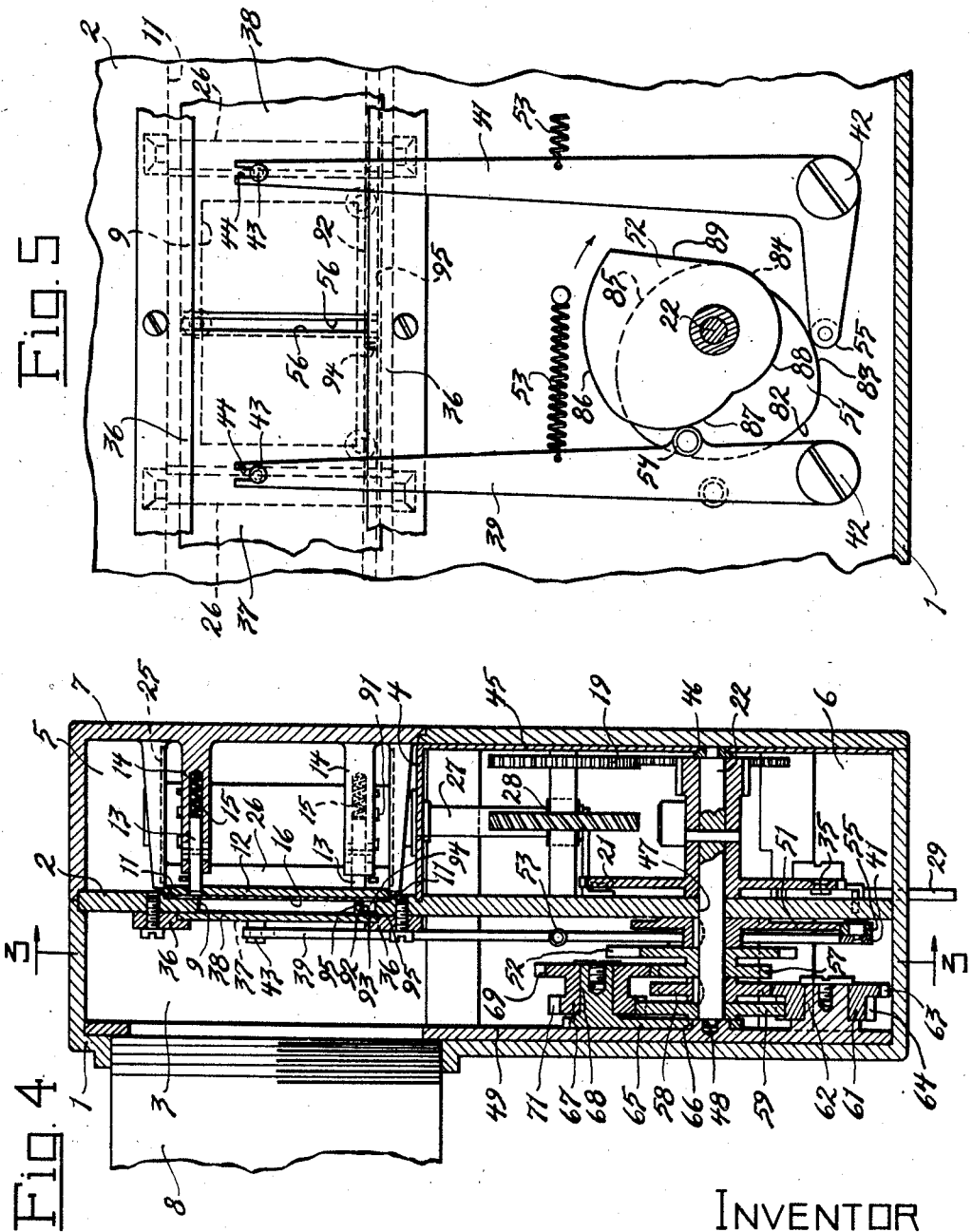
INVENTOR
BRUNO STECHBART
BY Robert F. Miehle Jr.
ATTY.

May 19, 1942.  B. STECHBART  2,283,586
LIGHT SHUTTER
Filed Feb. 28, 1940   6 Sheets-Sheet 4

INVENTOR
BRUNO STECHBART
BY
ATTY.

May 19, 1942.  B. STECHBART  2,283,586
LIGHT SHUTTER
Filed Feb. 28, 1940   6 Sheets-Sheet 5

INVENTOR
BRUNO STECHBART
BY Robert F. Miehle, Jr.
ATTY.

May 19, 1942.  B. STECHBART  2,283,586
LIGHT SHUTTER
Filed Feb. 28, 1940  6 Sheets-Sheet 6
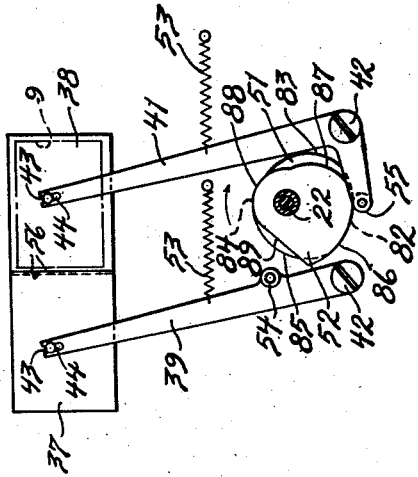
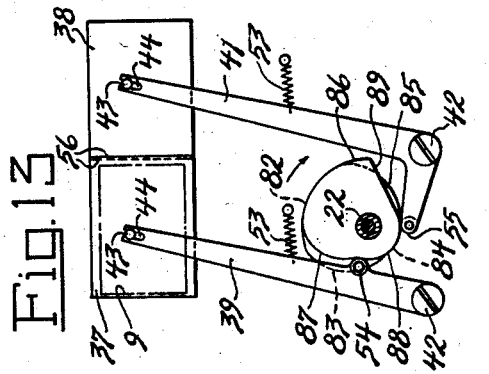
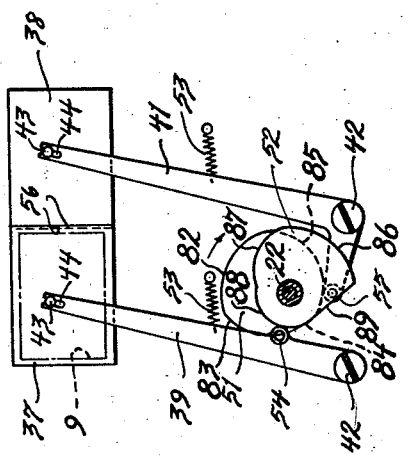
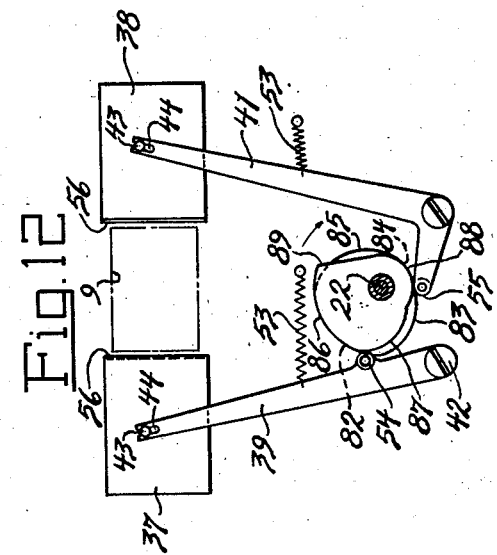
INVENTOR
BRUNO STECHBART
BY *Robert F. Miehle, Jr.*
ATTY.

Patented May 19, 1942

2,283,586

UNITED STATES PATENT OFFICE 2,283,586

LIGHT SHUTTER

Bruno Stechbart, Chicago, Ill., assignor to The Bell & Howell Company, Chicago, Ill., a corporation of Illinois Application February 23, 1940, Serial No. 321,252

12 Claims. (Cl. 95—55)

My invention relates particularly to exposure shutters of photographic cameras and has for its general object the provision of a novel, effective and reliable light shutter which provides for variation of the exposure thereof and which is particularly adapted for photographic cameras of the "miniature" type, the invention contemplating uniform adjusted exposure throughout the exposure area afforded by the shutter.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a top plan view of a photographic camera of the miniature type embodying my invention;

Figure 2 is a front elevation of the same;

Figure 3 is a partial sectional view substantially on the line 3—3 of Figure 4;

Figure 4 is a sectional view substantially on the line 4—4 of Figure 2;

Figure 5 is a partial sectional view similar to Figure 3, showing parts in different positions than those in which they are shown in Figure 3;

Figures 10, 11, 12 and 13 are diagrammatic views in elevation similar to Figures 3 and 5, showing parts in different positions.

Figure 6:
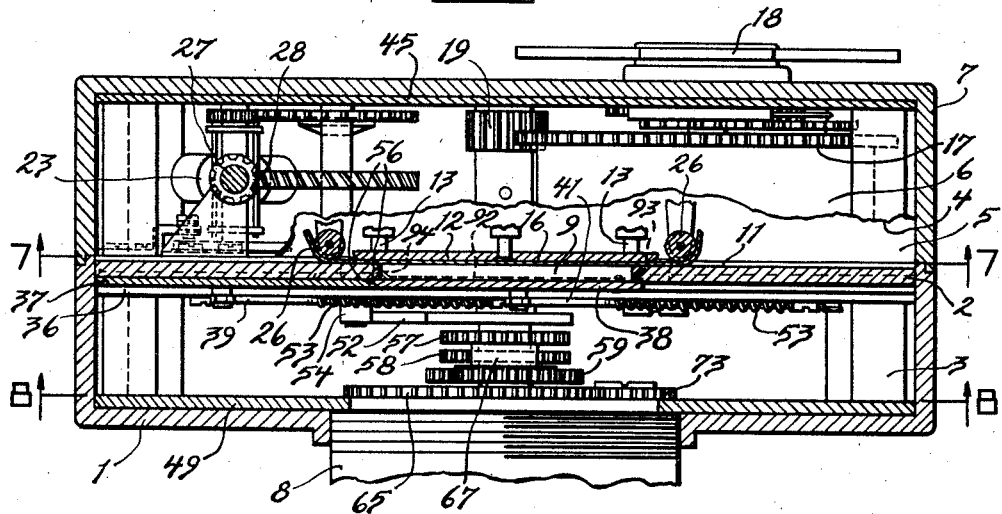
Figure 6 is a sectional view substantially on the line 6—6 of Figure 3.
Figure 7:
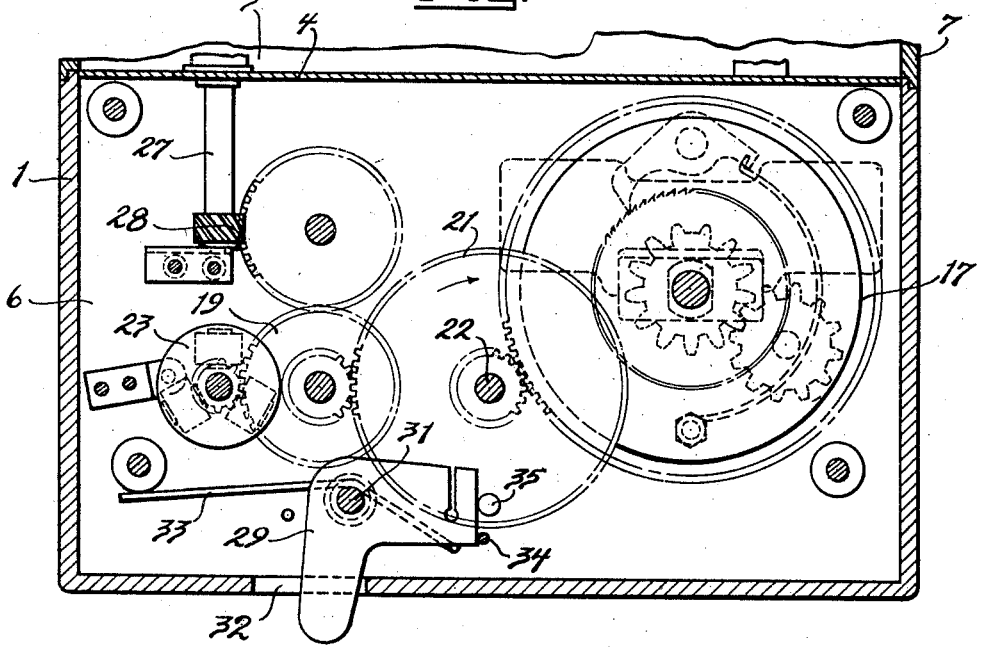
Figure 7 is a partial sectional view substantially on the line 7—7 of Figure 6.

Referring to the drawings, a camera casing is generally designated at 1 and is provided with an intermediate transverse vertical partition 2 forming a forward chamber portion 3 and a rearward chamber portion which is divided horizontally by a horizontal transverse partition 4 to form an upper chamber 5 and a lower chamber 6, the upper rear portion of the casing being formed by a separate casing portion 7 releasably secured to the main portion of the casing in a suitable manner not shown. See Figures 1, 2, 4, 6 and 7. Mounted on the forward wall of the casing is a suitable photographic lens 8 disposed on a forwardly and rearwardly extending axis traversing the chamber 5.

The partition 2 is provided with an exposure aperture 9 coinciding with the lens 8, and the rear face of this partition is provided with a rearwardly facing transverse film guide channel 11 extending across this exposure aperture and co-operating with a rear film face guide 12 provided with rearwardly extending studs 13 slidably mounted in bored extensions 14 of the casing portion and yieldably urged forwardly by springs 15, to provide a transverse exposure apertured film guide for positioning a sensitized film 16 at the exposure aperture 9, the film being transversely movable in the exposure guide for exposing successive portions thereof.

Disposed in the rear portion of the casing below the partition 4 on a forwardly extending horizontal axis, is a usual spring motor, generally designated at 17, which is wound by an exterior handle 18 at the rear of the casing. See Figures 6 and 7. This motor drives a multiplying spur gear train generally designated at 19 and which includes an intermediate gear 21 secured on a rotatable forwardly extending horizontal shaft 22. A centrifugal speed governor, of usual construction and generally designated at 23, is driven from this gear train for controlling the speed of the gear train and the mechanism driven thereby.

Two transversely spaced vertically disposed rotatable spools 24 and 25 are disposed in the rear portion of the casing above the partition 4 and beyond the opposite ends of the exposure guide, and the film 16 is fed from the spool 24 through the exposure guide and is wound on the spool 25 in the movement of the film through the guide for exposing successive portions of the film, film engaged revoluble rollers 26 being interposed between the ends of the exposure guide and the spools 24 and 25 for guiding the film. A revoluble vertical shaft 27, co-axial with the take up spool 25 and having a usual yieldable frictional drive connection therewith and accordingly not shown, is connected with the gear train 19 by right angle spiral gearing 28 for yieldably driving the take up spool with actuation of the gear train 19 by the motor 17.

Releasable stop mechanism controlling actuation of the mechanism consists of a bell crank lever 29 pivoted at 31 and having one end thereof projecting through a slot 32 in the lower wall of the casing for finger actuation of the lever, a spring 33 urging the lever into stopping position and against a stationary stud 34, and a stop stud 35 mounted on the gear 21 and releasably engageable with the other arm of the lever 29 to stop rotation of the gear train 19 and the mechanism actuated thereby. See Figures 4 and 7.

Parallel shouldered guides 36 are secured in horizontal position on the upper portion of the front face of the partition 2 above and below the exposure aperture 9 and form a transversely extending slide guide. Two light shutter members 37 and 38 are slidably mounted in this slide guide for independent reciprocating movement transversely across the exposure opening 9 for exposing the portion of the film 16 thereat as hereinafter described.

Two transversely spaced generally vertical arms 39 and 41 are disposed in the forward chamber 3 and have their lower portions pivoted on the partition 2 on transversely spaced forwardly extending axes, as designated at 42. See particularly Figures 3 to 6 inclusive. The upper ends of the arms 39 and 41 are operatively connected respectively with the shutter members 37 and 38 for independently reciprocating the shutter members by means of studs 43 on the shutter members slidably and pivotally engaged in longitudinal slots 44 of these arms.

The shaft 22 of the gear 21 is disposed adjacent the lower portions of the arms 39 and 41 and between the same and extends forwardly into the chamber 3, this shaft being journaled in a downward extension 45 of the partition 4 as designated at 46, in a bore 47 through the partition 2, and in a bore 48 in a stationary transverse plate 49 secured against the inner face of the front wall of the casing 1. See particularly Figure 4.

A radial cam 51 is secured on the shaft 22 for rotation therewith immediately in front of the partition 2, and a second radial cam 52 is rotatably mounted on the shaft 22 immediately in front of the cam 51. The arms 39 and 41 are independently actuated in one direction, with resulting corresponding movement of the shutter members 37 and 38 by transversely disposed tension springs 53 secured with the intermediate portions of these arms and anchored on the partition 2.

A cam roller 54 is mounted on the arm 39 a short distance above the pivotal axis of this arm and is engaged by the cam 52 for actuation of this arm in opposition to the spring 53 of this arm, and a cam roller 55 is mounted on the arm 41 a short distance from the pivotal axis of this arm and is engaged by the cam 51 for actuation of this arm in opposition to the spring 53 of this arm. Thus rotation of the cams 51 and 52 is effective to independently oscillate respectively the arms 39 and 41 and with them to independently reciprocate respectively the shutter members 37 and 38.

The opposing vertical edges 56 of the shutter members 37 and 38 have abutting relation and are shouldered as shown for excluding the passage of light therebetween when in abutting relation, see Figures 3, 6, 10, 11 and 13. When the shutter members are separated in their relative reciprocable movement, see Figures 5 and 12, the edges 56 form an exposure opening for exposing the portion of the film at the exposure aperture 9, which exposure opening is obviously variable by relative movement of the shutter members in their reciprocable movement.

Figure 8:
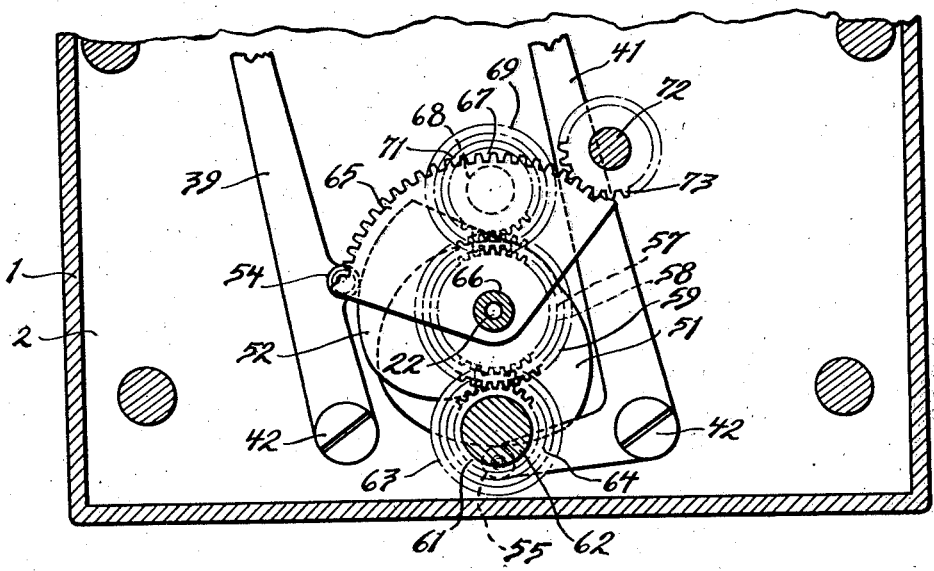
Figure 8 is a partial sectional view substantially on the line 8—8 of Figure 6.
Figure 9:
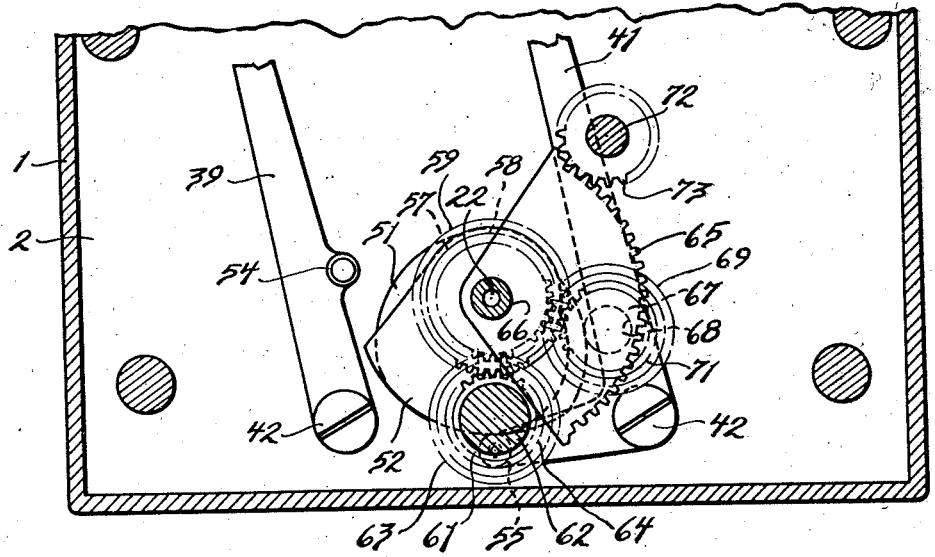
Figure 9 is a partial sectional view similar to Figure 8 showing parts in different positions than those in which they are shown in Figure 8.

The cams 51 and 52 are driven together in adjustable timed relation in the following manner. See Figures 4, 6, 8 and 9.

The cam 52, which is rotatable on the shaft 22, is provided with a forwardly disposed spur gear 57 fixed therewith, and a spur gear 58 of the same diameter as the gear 57 is secured on the shaft 22 in front of the gear 57 and is thus fixed with the cam 51 secured on the shaft 22. An idler spur gear 59, of larger diameter than the gears 57 and 58, is rotatably mounted on the shaft 22 in front of the gear 58. A bored counter gear member 61 is rotatably mounted on a rearwardly projecting hub 62 on the plate 49 and is provided with a large spur gear 63 meshing with the gear 58 and with a small spur gear 64 meshing with the gear 59, thus forming a drive between the gears 58 and 59 by which the gear 59 rotates slower than the gear 58.

An axially bored gear segment 65 is pivotally mounted on the plate 49 in co-axial relation with the shaft 22, as designated at 66, and bored counter gear member 67 is rotatably mounted on a rearwardly projecting hub 68 on this gear segment and spaced radially from the pivotal axis thereof. The gear member 67 is provided with a large spur gear 69 meshing with the gear 57 and with a small spur gear 71 meshing with the gear idler 59, thus forming a drive between the gears 57 and 59 by which the gear 59 rotates slower than the gear 57.

Thus a gear train drive is provided for driving the cams 51 and 52 in timed relation, and in as much as the diameter difference of the gears of one counter member correspond with that of the gears of the other counter gear member and in as much as corresponding gears of the counter gear members mesh with the idler gear 59, the cams are rotated in one to one relation.

By reason of the differential gear relationship established by reason of the gears 69 and 71 of the gear member 67 being of different diameters, pivotal adjustment of the gear segment 65 effects corresponding bodily adjustment of the gear member 67 relative to the gear member 61 on the axis of the co-axial gears 57, 58 and 59 and resulting adjustment of the timing of the cams 51 and 52 for the purpose hereinafter referred to. Pivotal adjustment of the gear segment 65 is effected in the following manner. A rotatable forwardly extending shaft 72 is rotatably carried on the casing 1, and a gear 73 is secured on this shaft and meshes the gear segment 65 for pivotally actuating the same with rotation of this shaft. See Figures 2, 6, 8 and 9.

A revoluble indicating dial 74, provided with a manipulating knob 75 is disposed on the exterior of the casing 1 and is secured on the shaft 72 for rotating the same to effect adjustment of the gear segment 65. The dial 74 is provided with peripherally spaced V-notches 76 corresponding with predetermined adjustments of the segment gear 65 and resulting predetermined adjustments of the timing of the cams 51 and 52 as noted on the dial at 77. A latch stud 78 is slidably mounted in a bored bracket 79, secured on the front wall of the casing 1, to releasably engage in a registering notch 76 and is so impelled by a spring 81 in a usual manner for releasably maintaining the gear segment 65 in adjusted position. See Figures 1 and 2.

Observing that the gear 21, being fixed on the shaft 22 and thus fixed with the cam 51, rotates in one to one relation with the cams 51 and 52, the stop stud 35 on the gear 21, as releasably engaged by the stop lever 29, stops the light shutter mechanism involving the shutter members 37 and 38 at a fixed point in the operating cycle thereof which is shown in Figures 3 and 11 and in which both of the shutter members 37 and 38 are positioned, as independently controlled respectively by the cams 52 and 51, at their extreme left or starting positions in abutting or light interrupting relation. In the exposure cycle, which starts from this extreme left position, the shutter member 38, actuated by the cam 51, moves to the right in advance of the shutter member 37 for separation therefrom to form an exposure opening between the opposing edges 56 of the shutter members, after the formation of which exposure opening the shutter member 37, actuated by the cam 52 driven in its adjusted timed relation with the cam 51, moves to the right in following relation with the shutter member 38 to effect uniform exposure of the portion of the film 16 at the exposure aperture 9. Figures 5 and 12 illustrate the exposure period in different adjustments of the cams 51 and 52 and consequent different separations of the shutter members resulting in exposures of different length.

When both of the shutter members arrive at their extreme positions to the right they again attain abutting or light interrupting relation after which they are moved to the left in this relation to their extreme left or starting positions in which the mechanism is stopped by engagement of the stop lever 29 with the stop stud 35 preparatory to another exposure cycle.

Figures 3, 5 and 10 illustrate the adjustment of the cams 51 and 52 for a relatively small exposure opening as shown in Figure 5, and Figures 11, 12 and 13 illustrate the adjustment of the cams 51 and 52 for a relatively large exposure opening as shown in Figure 12.

The cams 51 and 52 have corresponding portions as follows. The cam 51 has a dwell portion 82 corresponding with the extreme left or starting position of the shutter member 38, then an active portion 83 effecting right or exposure movement of the shutter member 38, then a dwell portion 84 corresponding with the extreme right position of this shutter member, and then an active portion 85 effecting left for return movement of this shutter member to its extreme left or starting position. The cam 52 has a dwell portion 86 corresponding with the extreme left or starting position of the shutter member 37 and with the portion 82 of the cam 51, then an active portion 87 effecting right or exposure movement of the shutter member 37 and corresponding with the portion 83 of the cam 51, then a dwell portion 88 corresponding with the extreme right position of this shutter member and with the portion 84 of the cam 51, and then a portion 89 corresponding with the return movement portion 85 of the cam 51, this portion 89 being relieved so that the shutter member 38 abuts the shutter member 37 in light interrupting relation and actuates it in its left or return movement independently of the cam 52 to assure light interruption during the left or return movement of the shutter members in the various adjustments of the cam members.

The corresponding active right or exposure movement portions 83 and 87 of the cams 51 and 52 are so formed that they impart uniform and equal velocity to the shutter members 37 and 38 in their right or exposure movement for uniform exposure of the instant portion of the film 16 at the exposure aperture 9, and by relative adjustment of the cams 51 and 52 as hereinbefore described these exposure cam portions are angularly displaced, which results in corresponding variation of the exposure opening formed by the shutter members by reason of the shutter member 38 initiating its right or exposure movement in adjusted priority to the member 37 initiating its corresponding right or exposure movement. The extreme open exposure adjustment of the cams 51 and 52 is illustrated in Figures 11, 12 and 13, in which, as shown in Figures 12, the shutter member 38 is positioned at the end of its right or exposure movement before the shutter member 37 initiates its right or exposure movement, the shutter member 38 remaining at the end of its exposure movement until the shutter member 37 has completed its right or exposure movement.

As shown and as an incident of the operation cycle of the shutter members 37 and 38, the film 16 is automatically advanced through the exposure guide for exposure of successive portions of the film at the exposure aperture 9. See Figures 3, 4, 5 and 6. The film 16 is provided with feed perforations 91, see Figure 4, such as are usual in motion picture film. A feed shuttle 92 of spring material is secured at one end, as designated at 93, on the lower outer end portion of the shutter member 38, and extends from its mounting on this shutter member longitudinally of the path of the shutter members. The other or free end of the shuttle 92 is formed into an angled rearwardly extending ratchet tooth 94 operating in a transversely extending slot 95 through the partition 2 and disposed below the exposure aperture 9 and yieldably urged against the film in the exposure guide.

The frictional drive of the film take up spool 25 is not sufficient to overcome the friction exerted upon the film 16 in the film guide by the springs 15, so that the film normally remains stationary, and also remains stationary during the exposure period in which the shutter members 37 and 38 operate for exposure or to the right in Figures 3, 5 and 10 to 13 inclusive as the tooth 94 of the shuttle 92 carried by the shutter member 38 ratchets over the feed perforations 91 of the film during the exposure period. However, on the left or non-exposure movement of the shutter members, the ratchet tooth 94 engages in a feed perforation 91 of the film and moves the same to the left through the exposure guide preparatory to exposing a succeeding portion of the film, the frictionally driven film take up spool 25 taking up the film as thus fed.

While I have thus described my invention, I do not wish to be limited to the precise details described as changes may be readily made without departing from the spirit of my invention, but having thus described my invention I claim as new and desire to secure by Letters Patent the following:

1. In a light shutter, the combination with two exposure opening forming shutter members movable for exposure and relatively movable correspondingly for varying the exposure opening formed thereby, of means for actuating said shutter members in correspondence for exposure comprising two relatively rotatable actuating members respectively operative on said shutter members, rotatory driving means connecting said actuating members and operative to constantly maintain the same in fixed angular relation, and adjustable means operative on said driving means for varying the timing of said actuating members whereby to vary said exposure opening.

2. In a light shutter, the combination with two exposure opening forming shutter members movable for exposure and relatively movable for exposure and relatively movable correspondingly for varying the exposure opening formed thereby, of means for actuating said shutter members in correspondence for exposure comprising a gear train operative between said shutter members and means operative to effect bodily adjustment between meshed gears of said train in a plane normal to the axis of one of said meshed gears for varying the timing of said shutter members whereby to vary said exposure opening.

3. In a light shutter, the combination with two exposure opening forming shutter members movable for exposure and relatively movable correspondingly for varying the exposure opening formed thereby, of means for actuating said shutter members in correspondence for exposure comprising two relatively rotatable co-axial gears respectively connected with said shutter members and intermediate rotatable gear means meshing with both of said coaxial gears in differential relation therewith, and means for bodily adjusting said intermediate gear means angularly on the axis of said co-axial gears for varying the timing of said shutter members whereby to vary said exposure opening.

4. In a light shutter, the combination with two exposure opening forming shutter members movable for exposure and relatively movable correspondingly for varying the exposure opening formed thereby, of means for actuating said shutter members in correspondence for exposure comprising three independently rotatable co-axial spur gears two of which are operatively connected respectively with said shutter members and the third of which is an idler gear, a rotatable counter gear member provided with two spur gears meshing respectively with one of said shutter member connected gears and said idler gear, a second rotatable counter gear member provided with two spur gears meshing respectively with the other shutter member connected gear and said idler gear, the gears of each counter gear member being of different diameters and the diameter difference of the gears of one counter gear member corresponding with that of the gears of the other counter gear member and corresponding gears of said counter gear members meshing with said idler gear, and means for bodily adjusting one of said counter gear members angularly on the axis of said three co-axial gears and with respect to the other of said counter gear members for varying the timing of said shutter members whereby to vary said exposure opening.

5. In a light shutter, the combination with two correspondingly reciprocable exposure opening forming shutter members relatively movable in their reciprocable movement for varying and closing the exposure opening formed thereby, of means for reciprocating said shutter members in correspondence to provide an exposure opening in but one direction of movement thereof comprising two relatively rotatable actuating members respectively operative on said shutter members, rotatory driving means connecting said actuating members and operative to constantly maintain the same in fixed angular relation, and adjustable means operative on said driving means for varying the timing of said actuating members whereby to vary said exposure opening.

6. In a light shutter, the combination with two correspondingly reciprocable exposure opening forming shutter members relatively movable in their reciprocable movement for varying and closing the exposure opening formed thereby, of means for reciprocating said shutter members in correspondence to provide an exposure opening in but one direction of movement thereof comprising two rotatory actuating members for respectively reciprocating said shutter members, a gear train connecting said actuating members, and means operative to effect bodily adjustment between meshed gears of said train in a plane normal to the axis of one of said meshed gears for varying the timing of said shutter members whereby to vary said exposure opening.

7. In a light shutter, the combination with two correspondingly reciprocable exposure opening forming shutter members relatively movable in their reciprocable movement for varying and closing the exposure opening formed thereby, of means for reciprocating said shutter members in correspondence to provide an exposure opening in but one direction of movement thereof comprising two rotatory actuating members for respectively reciprocating said shutter members, a gear train connecting said actuating members and comprising relatively rotatable co-axial gears respectively connected with said actuating members and intermediate gear means meshing with both of said co-axial gears in differential relation therewith, and means for bodily adjusting said intermediate gear means angularly on the axis of said co-axial gears for varying the timing of said actuating members whereby to vary said exposure opening.

8. In a light shutter, the combination with two correspondingly reciprocable exposure opening forming shutter members relatively movable in their reciprocable movement for varying and closing the exposure opening formed thereby, of means for reciprocating said shutter members in correspondence to provide an exposure opening in but one direction of movement thereof comprising spring means for independently actuating said shutter members in one direction, two rotatory actuating members respectively operative on said shutter members in opposition to said spring means, rotatory driving means connecting said actuating members and operative to constantly maintain the same in fixed angular relation, and adjustable means operative on said driving means for varying the timing of said actuating members whereby to vary said exposure opening.

9. In a light shutter, the combination with two correspondingly reciprocable exposure opening forming shutter members relatively movable in their reciprocable movement for varying and closing the exposure opening formed thereby and having abutting engagement in closing relation, of means for reciprocating said shutter members in correspondence to provide an exposure opening in but one direction of movement thereof comprising spring means for independently actuating said shutter members in the exposure direction thereof, two rotatory actuating members respectively operative on said shutter members in opposition to said spring means, rotatory driving means connecting said actuating members and operative to constantly maintain the same in fixed angular relation, and adjustable means operative on said driving means for varying the timing of said actuating members whereby to vary said exposure opening.

10. In a light shutter, the combination with two correspondingly reciprocable exposure opening forming shutter members relatively movable in their reciprocable movement for varying the exposure opening formed thereby, of means for actuating said shutter members in correspondence for exposure comprising two pivoted arms operatively connected respectively with said shutter members, two rotatory actuating members respectively operative on said arms, driving means connecting said actuating members, and adjustable means operative on said driving means for varying the timing of said actuating members whereby to vary said exposure opening.

11. In a light shutter, the combination with two correspondingly reciprocable exposure opening forming shutter members relatively movable in their reciprocable movement for varying and closing the exposure opening formed thereby, of means for reciprocating said shutter members in correspondence to provide an exposure opening in but one direction of movement thereof comprising two pivoted arms operatively connected respectively with said shutter members, spring means for independently actuating said shutter members in one direction, two rotatory actuating members respectively operative on said arms in opposition to said spring means, driving means connecting said actuating members, and adjustable means operative on said driving means for varying the timing of said actuating members whereby to vary said exposure opening.

12. In a light shutter, the combination with two corresponding reciprocable exposure opening forming shutter members relatively movable in their reciprocable movement for varying and closing the exposure opening formed thereby and having abutting engagement in closing relation, of means for reciprocating said shutter members in correspondence to provide an exposure opening in but one direction of movement thereof comprising two pivoted arms operatively connected respectively with said shutter members, spring means for independently actuating said shutter members in the exposure direction thereof, two rotatory cam members respectively operative on said arms in opposition to said spring means, driving means connecting said cam members, and adjustable means operative on said driving means for varying the timing of said cam members whereby to vary said exposure opening.

BRUNO STECHBART.